United States Patent
To et al.

(10) Patent No.: US 9,106,297 B2
(45) Date of Patent: Aug. 11, 2015

(54) RECEIVING APPARATUS, TRANSMITTING APPARATUS AND WIRELESS COMMUNICATION SYSTEM USING THEM

(75) Inventors: Shimpei To, Osaka (JP); Takashi Onodera, Osaka (JP); Kozue Hirata, Osaka (JP); Hiroshi Nakano, Osaka (JP); Hiromichi Tomeba, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 13/700,949

(22) PCT Filed: May 27, 2011

(86) PCT No.: PCT/JP2011/062219
§ 371 (c)(1),
(2), (4) Date: Nov. 29, 2012

(87) PCT Pub. No.: WO2011/152308
PCT Pub. Date: Dec. 8, 2011

(65) Prior Publication Data
US 2013/0070871 A1    Mar. 21, 2013

(30) Foreign Application Priority Data
May 31, 2010    (JP) ................................. 2010-124735

(51) Int. Cl.
*H04L 25/49*    (2006.01)
*H04B 7/06*    (2006.01)
*H04B 7/04*    (2006.01)

(52) U.S. Cl.
CPC ............ *H04B 7/0697* (2013.01); *H04B 7/0452* (2013.01); *H04B 7/0626* (2013.01); *H04B 7/0465* (2013.01)

(58) Field of Classification Search
CPC ............................ H04B 7/0456; H04B 7/0452

USPC .......................................................... 375/296
See application file for complete search history.

(56) References Cited

U.S. PATENT DOCUMENTS

| | | | |
|---|---|---|---|
| 2003/0133426 A1* | 7/2003 | Schein et al. ................. | 370/337 |
| 2005/0160128 A1* | 7/2005 | Fardanesh ..................... | 708/446 |

(Continued)

FOREIGN PATENT DOCUMENTS

| | | |
|---|---|---|
| JP | 2007-214758 A | 8/2007 |
| JP | 2010-28384 A | 2/2010 |

OTHER PUBLICATIONS

Hiroshi Harashima, et al., "Matched-Transmission Technique for Channels with Intersymbol Interference", IEEE Transactions on Communications, vol. COM-20, No. 4, Aug. 1972, pp. 774-780.

(Continued)

*Primary Examiner* — Santiago Garcia
(74) *Attorney, Agent, or Firm* — Birch, Stewart, Kolasch & Birch, LLP

(57) ABSTRACT

When spatial multiplexing is performed to any of a plurality of receiving antennas included in each terminal, it becomes possible to obtain excellent receiving characteristics by combining signals received by all antennas appropriately. A receiving antenna unit 28 receives channel state information from each terminal, a channel matrix H is obtained. A transmit weight/interference coefficient calculation unit 24 calculates a transmit weight and an interference coefficient based on channel matrix. The transmit weight is input to transmit weight multiplication units 17 and 23. The interference generation unit 15 generates an interference signal based on the interference coefficient. An interference subtraction unit 13 subtracts the interference signal from a desired signal. A modulo unit 14 adds a signal so that amplitude of an information signal output from the interference subtraction unit 13 falls within a constant range. A signal multiplexing unit 18 performs spatial multiplexing to the signal performed nonlinear arithmetic.

7 Claims, 7 Drawing Sheets

(56) References Cited

U.S. PATENT DOCUMENTS

| | | | |
|---|---|---|---|
| 2007/0025421 A1* | 2/2007 | Shattil | 375/136 |
| 2008/0293371 A1* | 11/2008 | Kishigami et al. | 455/278.1 |
| 2010/0067362 A1* | 3/2010 | Sakaguchi et al. | 370/203 |
| 2010/0067368 A1* | 3/2010 | Lee et al. | 370/210 |
| 2010/0111157 A1* | 5/2010 | Sawai | 375/232 |
| 2010/0330946 A1* | 12/2010 | Akkarakaran et al. | 455/273 |
| 2012/0099459 A1* | 4/2012 | Uhlik et al. | 370/252 |

OTHER PUBLICATIONS

Hiroshi Nakano, et al., "Adaptive THP Scheme Control for Downlink MU-MIMO Systems", RCS2009-293 (Mar. 2010) with a partial English translation.

Jia Liu, et al., "Improved Tomlinson-Harashima Precoding for the Downlink of Multiple Antenna Multi-User Systems", Proc. IEEE Wireless and Commun. And Net. Conf., pp. 466-472.

Michael Joham, et al., "MMSE Approaches to Multiuser Spatio-Temporal Tomlinson-Harashima Precoding", ITG SCC04, pp. 387-394. (2004).

Quentin H. Spencer, et al., "An Introduction to the Multi-User MIMO Downlink", IEEE Communication Magazine, vol. 42, Issue 10, pp. 60-67.

Sameer Vermani, et al., "Interference Cancellation for Downlink MU-MIMO", IEEE802.11-0911234r0 (Nov. 2009).

Nir Shapira, DPC for MU-MIMO, IEEE 802.11-10/0530r0 May 2010, pp. 2-31.

* cited by examiner

RECEIVING APPARATUS, TRANSMITTING APPARATUS AND WIRELESS COMMUNICATION SYSTEM USING THEM

FIELD OF THE INVENTION

The present invention relates to a receiving apparatus, a transmitting apparatus and a wireless communication system using them in which in MIMO transmission or the like, from a base station having a plurality of transmitting antennas, a signal subjected to spatial multiplexing is transmitted to a terminal apparatus having a plurality of receiving antennas.

BACKGROUND ART

In order to resolve densely used frequency resources along with an increased data communication volume in the cellular system, as a technology to realize a high frequency usage efficiency and high-speed transmission, downlink MIMO (Multiple-Input Multiple-Output) transmission in which a plurality of transmitting signals are subjected to spatial multiplexing using a plurality of transmitting antennas included in a base station has been actively researched. In the downlink MIMO transmission, Single User-MIMO (SU-MIMO) in which a plurality of transmitting signals are subjected to spatial multiplexing which are addressed to a single terminal having a plurality of antennas is an essential technology to improve maximum transmission speed of each terminal, in which, however, there is a possibility that a transmitting antenna included in a base station is not effectively used due to limitation of the number of antennas included in the terminal. Contrary to this, as shown in FIG. 7, Multi User-MIMO (MU-MIMO) in which transmitting signals addressed to a plurality of terminals 2000a, b and c are subjected to spatial multiplexing to be transmitted simultaneously enables to effectively use an antenna on a base station side even when only a small number of antennas are included in the respective terminals 2000-a, b and c, thus attracting attention as a technology to improve cell throughput.

In the MU-MIMO transmission, for transmission of signals addressed to a plurality of terminals with a same resource, it is necessary to apply precoding to signals on a base station side in advance for transmission so that those received by respective terminals do not interfere with each other. A method of the precoding is roughly classified into linear precoding in which a plurality of transmitting signals are multiplied by a linear weight, and nonlinear precoding in which a known interference signal is sequentially subtracted from a transmitting signal and thereafter multiplied by a linear weight, in which the linear precoding is, though characteristics thereof are slightly degraded compared with the nonlinear precoding, able to realize spatial multiplexing to a plurality of signals with very simple processing.

The linear precoding includes some types, in which linear MMSE (Minimum Mean Square Error) precoding which minimizes a mean square error between a signal received at each terminal and a desired signal is a method in which excellent transmitting characteristics are obtained with relatively simple processing. Here, a weight $P_{MMSE}$ according to linear MMSE is shown as follows in a case where a base station having four transmitting antennas performs spatial multiplexing to signals for four terminals each having two receiving antennas. Note that, each terminal is assumed to notify a base station of channel states between one of the two receiving antennas included in each terminal and the four antennas included in the base station. When a matrix which collectively represents channels notified from each of the terminals respectively is assumed to be H, the weight $P_{MMSE}$ is expressed as follows.

[Math 1]

$$P_{MMSE} = (H^H H + \xi I_{4 \times 4})^{-1} H^H \quad (1)$$

Wherein, $H=[H_{11}{}^T \ H_{21}{}^T \ H_{31}{}^T \ H_{41}{}^T]^T$, and $H_{mn}$ is a vector with one row and four columns representing channels between an antenna n of a terminal m and four antennas in a base station. Further, $\xi$ is a mean noise power to signal power ratio, and $I_{k \times k}$ shows a unit matrix of k rows and k columns. Here, when a signal vector addressed to terminals is assumed to $x=[x_1 \ x_2 \ x_3 \ x_4]^T$, a receiving signal vector of collected signals received by respective antennas for notification of a channel to the base station, $y=[y_{11} \ y_{21} \ y_{31} \ y_{41}]^T$ is represented by $y = H P_{MMSE} x + n$. Wherein $n=[n_{11} \ n_{21} \ n_{31} \ n_{41}]^T$ is a vector representing thermal noise added at the antenna n of the terminal m.

Multiplying a signal addressed to each terminal by such a linear weight $P_{MMSE}$ for transmission enables to perform spatial multiplexing to signals addressed to a plurality of terminals while suppressing multi-user interference in which signals addressed to respective terminals interfere with each other on a receiving side. In this manner, the terminal m for receiving signals after being subjected to spatial multiplexing in this manner demodulates signals received by an antenna 1 respectively to be able to obtain desired information, however, each terminal has two receiving antennas respectively and even at an antenna 2 which is not a target of spatial multiplexing processing in the base station, some signal is to be received. The signal received by the antenna 2 is not the target of spatial multiplexing processing in the base station, and thus includes a considerably large amount of multi-user interference, so that even when the signal received by the antenna 2 of each terminal is demodulated, it is impossible to obtain a desired signal correctly. However, it has been known that since this signal also includes a desired signal component, appropriately combined with the signal received by the antenna 1 and the combined signal is demodulated, excellent receiving characteristics are thereby able to be obtained compared to a case where a signal received only by the antenna 1 is demodulated (Non-Patent Literature 1).

Here, a receiving signal vector $y_m = [y_{m1} \ y_{m2}]^T$ received by two antennas of the terminal m is expressed by $y_m = H_m P_{MMSE} x + n_m$. Wherein $H_m = [H_{m1}{}^T \ H_{m2}{}^T]^T$, and $n_m = [n_{m1} \ n_{m2}]^T$ is a thermal noise vector at the terminal m. In a combining method shown in Non-Patent Literature 1, such the received signal is multiplied by a receiving MMSE weight expressed by the following formula and subjected to combining. The receiving weight is to minimize a mean square error between a signal received at each terminal and a transmitting signal.

[Math 2]

$$W_m = (H_{mm} P_{MMSE})^H \{H_m P_{MMSE} (H_m P_{MMSE})^H + \xi I_{2 \times 2}\}^{-1} \quad (2)$$

The signal after multiplication of a receiving weight at the terminal m is expressed as $W_m y_m = W_m (H_m P_{MMSE} x + n_m)$, and an m-th signal among the signals after multiplication of the receiving weight is a desired signal of the terminal m. At each terminal, signals received by two antennas are combined in this way, so that it becomes possible to combine a desired signal component included in a signal received by an antenna which is not subjected to spatial multiplexing on a base station side, thereby allowing to obtain excellent receiving characteristics compared to the case of demodulating a signal received by one antenna.

Additionally, in general, there is a difference between the time of measuring a channel H at a terminal and the time of spatial multiplexing transmission using a linear weight based on the measured channel H, and thus, in the case of movement of a terminal, or the like, the channel varies temporally so that the multi-user interference is not completely suppressed, which poses a problem, however, since the combining method shown in Non-Patent Literature 1 is a method of combining signals received by two antennas based on an actual channel state in spatial multiplexing transmission, which is considered to be effective for suppressing multi-user interference occurred due to such time variation of a channel.

PRIOR ART LITERATURES

Non-Patent Literatures

Non-Patent Literature 1: "Interference Cancellation for Downlink MU-MIMO," IEEE802.11 09/1234r0, November 2009.

SUMMARY OF THE INVENTION

Problems to be Solved by the Invention

Combining signals received by two antennas using a receiving weight as shown in Non-Patent Literature 1 enables combining of a desired signal component included in a signal received by an antenna which is not subjected to spatial multiplexing on a base station side so that excellent receiving characteristics are able to be obtained compared to the case of demodulating a signal received by one antenna. Such combining is processing on a receiving side, and is considered to be applicable to not only a signal subjected to spatial multiplexing with the above-described linear precoding but also a signal subjected to spatial multiplexing with precoding including non-linear processing (non-linear precoding), thus expected to be able to improve receiving characteristics at each terminal receiving a signal subjected to spatial multiplexing with the non-linear precoding.

However, in the case of performing spatial multiplexing using THP (Tomlinson Harashima Precoding) as one of the representative non-linear precoding, even though signals received by two receiving antennas included in each terminal are combined with use of a receiving weight expressed by the formula (2), appropriate combining is not able to be performed so that receiving characteristics becomes deteriorated, which poses a problem. Accordingly, the conventional technology directed to spatial multiplexing with linear processing is not able to realize an MU-MIMO system in which signals subjected to spatial multiplexing with non-linear precoding is transmitted from a base station and the signals received at a plurality of receiving antennas are appropriately combined on a terminal side.

In view of the circumstances, the present invention provides a receiving apparatus, a transmitting apparatus and a wireless communication system using them in which in a system for transmitting simultaneously transmitting signals addressed to a plurality of terminals with non-linear spatial multiplexing, when spatial multiplexing is performed to any of a plurality of receiving antennas included in each terminal as a target, it becomes possible to combine signals received by all antennas appropriately, so that excellent receiving characteristics are able to be obtained.

Means to Solve the Problems

The present invention provides a receiving apparatus provided with N pieces of receiving antennas where N is an integer of 2 or more which receives a signal transmitted from a transmitting apparatus which is provided with a plurality of transmitting antennas and performs spatial multiplexing to signals addressed to a plurality of receiving apparatuses using nonlinear arithmetic, characterized in that, an information signal in which interference is subtracted from a desired signal and performed spatial multiplexing for transmission based on information concerning channels in the plurality of receiving apparatuses in the transmitting apparatus is received by N pieces of the receiving antennas, the information signal received by N pieces of the receiving antennas is multiplied by a receiving weight to be combined, and nonlinear arithmetic is performed to the combined information signal so that a desired information signal is detected.

Further, the receiving apparatus of the present invention is characterized in that the receiving weight is a weight which minimizes a mean square error between the desired information signal transmitted from the transmitting apparatus and the information signal after multiplication of the receiving weight.

Further, the receiving apparatus of the present invention is characterized in that the receiving weight includes a term representing a coefficient of the subtracted interference.

Further, the receiving apparatus of the present invention is characterized in that the term representing a coefficient of the subtracted interference is obtained based on information notified from the transmitting apparatus.

Further, the receiving apparatus of the present invention is characterized in that the nonlinear arithmetic is modulo arithmetic.

Further, the receiving apparatus of the present invention is characterized in that the transmitting apparatus is notified of information concerning the channels of less than N.

Further, the present invention provides a transmitting apparatus provided with a plurality of transmitting antennas which performs spatial multiplexing to information signals addressed to a plurality of receiving apparatuses including a first receiving apparatus provided with N pieces of receiving antennas where N is an integer of 2 or more for performing communication, characterized in that, a coefficient representing a transmit weight and interference in spatial multiplexing using nonlinear arithmetic is calculated based on information concerning a channel of less than N notified from the first receiving apparatus and information concerning a channel notified from another receiving apparatus, the interference is subtracted from a desired signal, and a subtraction result is multiplied by the transmit weight for performing spatial multiplexing to information signals addressed to a plurality of receiving apparatuses.

Further, the transmitting apparatus of the present invention is characterized in that the receiving apparatus is notified of information concerning the coefficient representing interference.

Further, the transmitting apparatus of the present invention is characterized in that the nonlinear arithmetic is modulo arithmetic.

Further, the present invention provides a wireless communication system comprising the receiving apparatus and the transmitting apparatus.

Advantages of the Invention

Using the present invention, in a system for transmitting simultaneously transmitting signals addressed to a plurality of terminals with non-linear spatial multiplexing, when spatial multiplexing is performed to any of a plurality of receiving antennas included in each terminal as a target, it is possible to combine signals received by all antennas appropriately, so that excellent receiving characteristics are able to be obtained.

MODE FOR CARRYING OUT THE INVENTION

Description will hereinafter be given for embodiments of the present invention with reference to attached drawings.

Figure 1:
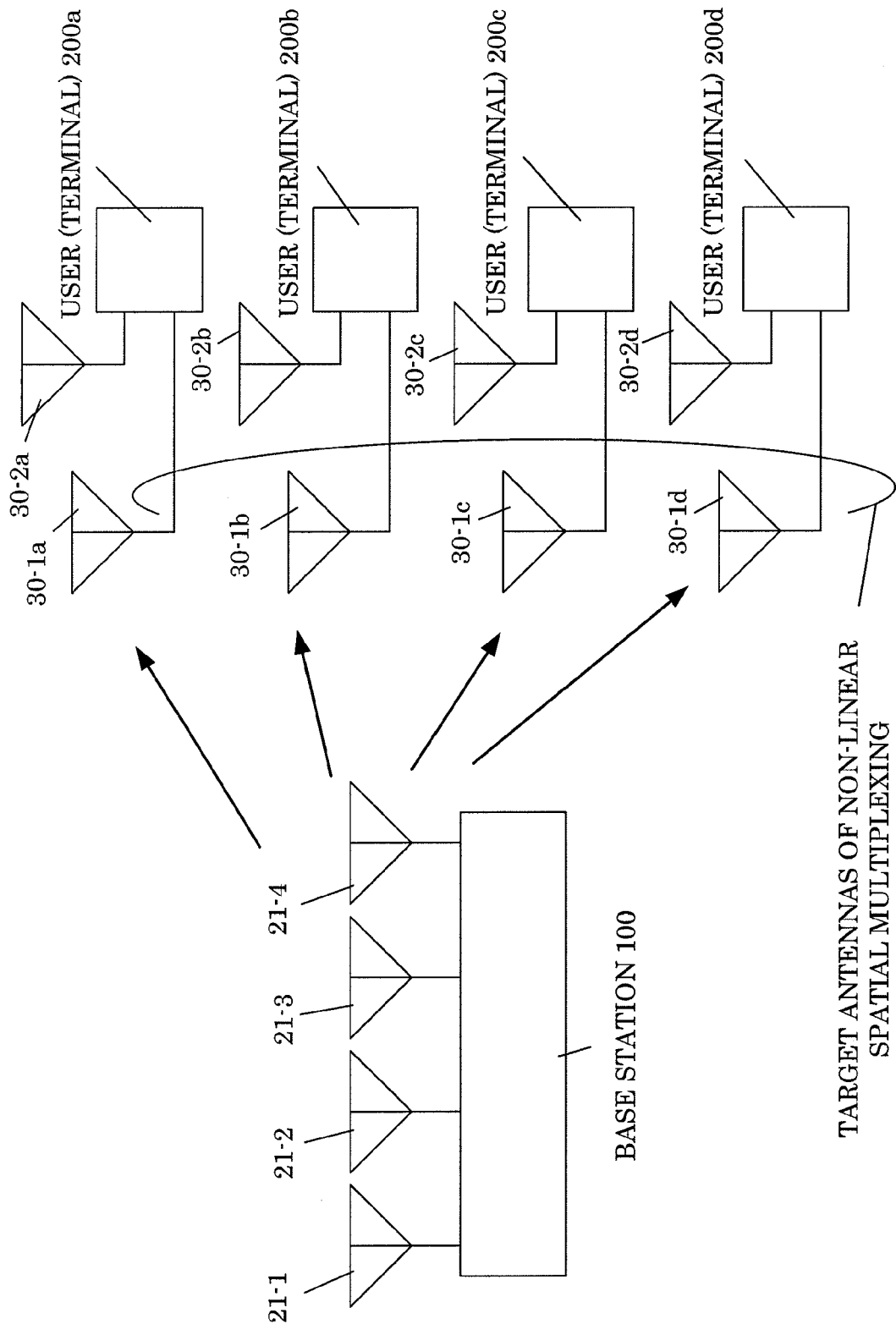
FIG. 1 is a diagram showing an MU-MIMO wireless communication system according to the present invention.

First, an MU-MIMO system according to the present invention is shown in FIG. 1. As shown in FIG. 1, in the MU-MIMO system according to the present invention, a base station 100 having a plurality of transmitting antennas performs spatial multiplexing including non-linear processing to different signals addressed to terminals 200a, 200b, 200c and 200d having a plurality of receiving antennas to be transmitted with the same resource. Note that, the transmitting processing is performed in such a way that the total number of receiving antennas to be subjected to spatial multiplexing of all the terminals 200a to 200d is larger than the number of transmitting antennas included in the base station 100, and in the base station 100, any of the plurality of receiving antennas included in each of the terminals 200a to 200d are to be subjected to non-linear spatial multiplexing (hereafter, referred to as spatial multiplexing target antennas, while the other receiving antennas are referred to as auxiliary antennas) so that multi-user interference to signals received by those spatial multiplexing target antennas is suppressed. Note that, the number of terminals in FIG. 1 is four, however not limited thereto.

In the example shown in FIG. 1, each of the spatial multiplexing target antennas is an antenna that has a numeral 30-1 added thereto, and each of the auxiliary antennas is an antenna that has a numeral 30-2 added thereto. In this FIG. 1, a configuration is provided in which the base station 100 includes four transmitting antennas 21-1 to 21-4 and each terminal 200-1, 2 or 3 has two receiving antennas 30-1 and 30-2, so that one stream (signal sequence) is transmitted from the base station 100 to each terminal, however, not limited thereto, and for example, a terminal may have three or more receiving antennas, and in such a case, it may be configured that two or more streams are transmitted to one terminal. However, it is assumed that the number of streams transmitted to each terminal is less than the number of receiving antennas included in each terminal, and a plurality of streams transmitted to one terminal are separated from each other to be received at the terminal. In addition, all terminals to be subjected to spatial multiplexing do not necessarily have a plurality of antennas, and a terminal having only one receiving antenna may be mixed. Further, in the base station, the number of transmitting antennas is not limited to four, and a plurality of transmitting antennas just have to be included. Moreover, depending on a system, all of a plurality of transmitting antennas included in the base station is not necessarily used for transmission all the time, and some of the transmitting antennas are selected in the base station to be used, and signals are not transmitted from unselected transmitting antennas in some cases. In such cases, the present invention is directed to a circumstance where the total number of receiving antennas of all terminals which are to be subjected to spatial multiplexing exceeds the number of transmitting antennas used for transmission in the base station (the number of selected transmitting antennas).

In such an MU-MIMO system, the present invention provides a communication system which shows an appropriate combining method in combining signals received by the spatial multiplexing target antennas and the auxiliary antennas respectively, enables to obtain excellent receiving characteristics, and is excellent in a frequency usage efficiency.

First Embodiment

In the first embodiment according to the present invention, description will be given for transmitting processing of MU-MIMO transmission using THP (THP MU-MIMO) transmission which is directed to a spatial multiplexing target antenna, and subsequently, description will be given for processing to combine a received signal by a spatial multiplexing target antenna and a received signal by an auxiliary antenna included in each terminal in the case of performing the THP MU-MIMO transmission.

Figure 2:
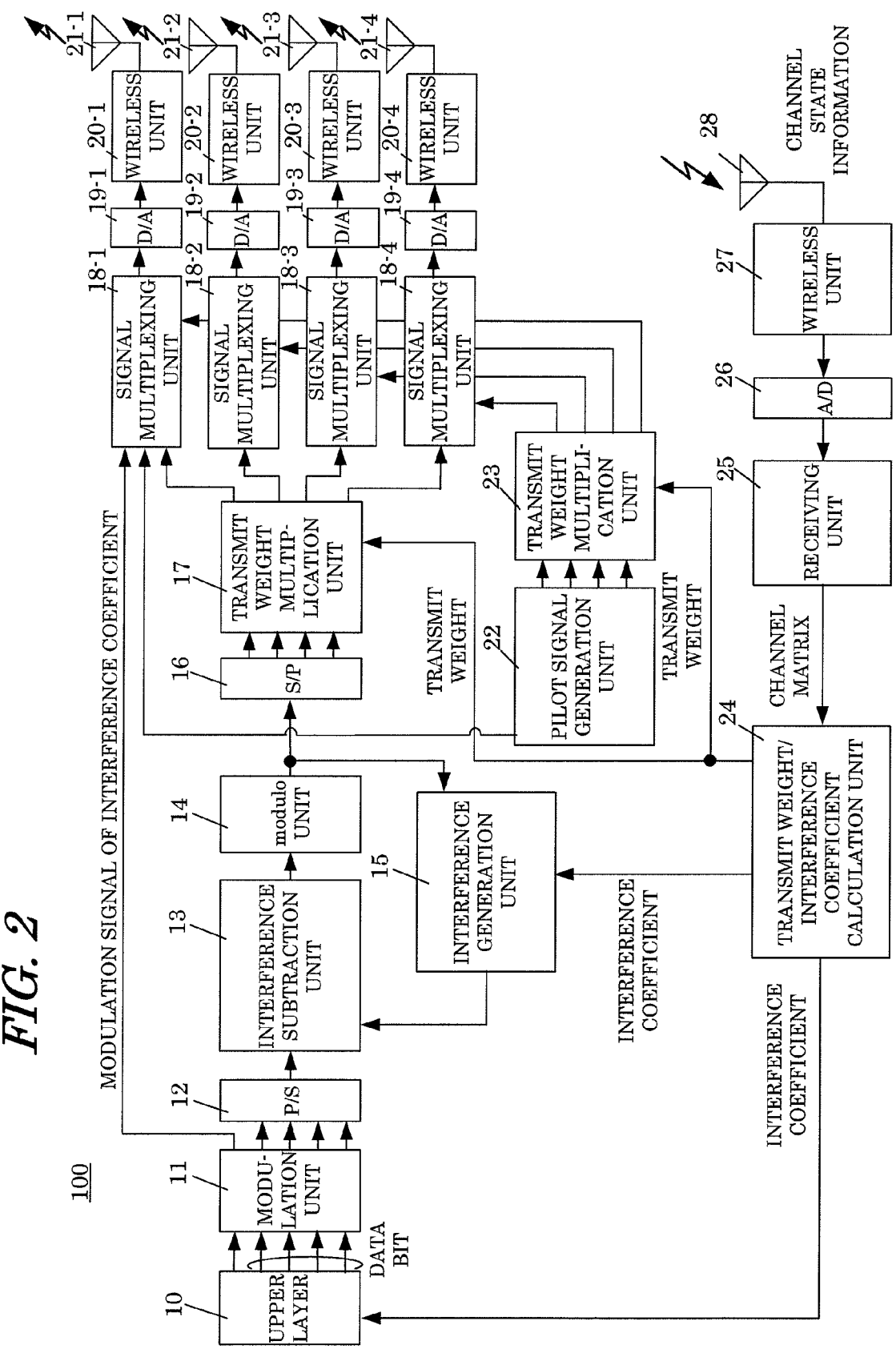
FIG. 2 is a block diagram showing a base station in a first embodiment.

First, description will be given for transmitting processing of THP MU-MIMO transmission to which the first embodiment is directed to using a configuration of a base station. A base station configuration in the present embodiment is shown in FIG. 2. As shown in FIG. 2, the base station 100 in the present embodiment is comprised of an upper layer 10, a modulation unit 11, a P/S unit 12, an interference subtraction unit 13, a modulo unit 14, an interference generation unit 15, an S/P unit 16, transmit weight multiplication units 17 and 23, a signal multiplexing unit 18, a D/A unit 19, wireless units 20 and 27, a transmitting antenna unit 21, a pilot signal generation unit 22, a transmit weight/interference coefficient calculation unit 24, a receiving unit 25, an A/D unit 26, and a receiving antenna unit 28.

In the case of performing THP MU-MIMO transmission in the base station 100, first, channel state information (CSI) fed back from each terminal to be subjected to spatial multiplexing is received by the receiving antenna unit 28, and the received signal is converted into an A/D convertible frequency at the wireless unit 27, and after being converted into a digital signal from an analog signal at the A/D unit 26, demodulated or the like at the receiving unit 25 so that a channel matrix H is obtained. Note that, the channel state information fed back from the respective terminals 200a to 200d refers to channels between transmitting antennas of the base station 100 and spatial multiplexing target antennas in the respective terminals 200a to 200d, and as shown in FIG. 1, when each of the spatial multiplexing target antennas in each of the terminals 200a to 200d is the antennas 30-1, $H=[H_{11}^T \ H_{21}^T \ H_{31}^T \ H_{41}^T]^T$. Herein, $H_{mn}$ is a vector with one row and four columns representing channels between an antenna n in a terminal m and four antennas in a base station. Further, any transmitting method may be used for an uplink transmission method from the respective terminals to the base station, and in FIG. 2, only one receiving antenna is provided, however, it may be configured that a plurality of receiving antennas are provided so as to perform uplink MU-MIMO transmission.

The channel matrix thus obtained is input to the transmit weight/interference coefficient calculation unit 24 for calculation of a transmit weight and an interference coefficient which are necessary for performing THP MU-MIMO transmission. Specific calculation method of these will be described below. An interference coefficient is information concerning an interference signal, and an interference signal is able to be generated based thereon. The transmit weights and the interference coefficients calculated at the transmit weight/interference coefficient calculation unit 24 are input to the transmit weight multiplication units 17 and 23, and the upper layer 10 and the interference generation unit 15, respectively.

In the upper layer 10, specific data transmitted to each of the terminals 200a to 200d is generated to be input to the modulation unit 11. Further, here, it is configured that respective terminals are notified of the interference coefficients input from the transmit weight/interference coefficient calculation unit 24, and the interference coefficients are thus converted into digital information to be input to the modulation unit 11. As described below, the interference coefficient in the present embodiment is represented by a lower triangular matrix, it is thus not necessary to notify a terminal of all elements in the lower triangular matrix, and a value other than zero, namely, only a lower triangular element may be notified. Furthermore, since each terminal needs to be notified of a coefficient for normalizing power also, processing similar to that of interference coefficient is performed. At the modulation unit 11, input digital data is modulated so that modulation signals such as QPSK and 16 QAM are generated. Here, modulation is performed for four data pieces of data transmitted to four terminals respectively, the interference coefficient and the power normalization coefficient notified commonly to the four terminals.

Signals modulated at the modulation unit 11 are input to the P/S unit 12 and the signal multiplexing unit 18. Here, a signal of modulated specific data addressed to each terminal which is subjected to spatial multiplexing to be transmitted is input to the P/S unit 12, and a signal of a modulated interference coefficient or the like which is not subjected to spatial multiplexing and notified commonly to each terminal is input to the signal multiplexing unit 18. In the P/S unit 12 to which the data signal addressed to each terminal is input, parallel-serial conversion is performed and in the THP MU-MIMO to which the present invention is directed, subtraction of an interference signal at the interference subtraction unit 13 is sequentially performed for each terminal, and therefore the signals addressed to the four terminals are rearranged so as to be output in sequence for each modulation signal. Here, it is assumed that modulation signals are output from the P/S unit 12 in the order of signals addressed to the terminals 200a, 200b, 200c and 200d.

For the signals output in sequence in this manner, at the interference subtraction unit 13, processing to subtract an interference signal from a desired signal is performed sequentially. This is processing of subtracting an interference signal input from the interference generation unit 15 from an input modulation signal, and the interference signal here refers to the multi-user interference in the THP MU-MIMO transmission. The interference signal is specifically a signal generated based on a modulation signal output prior to the modulation signal subjected to subtraction processing as the desired signal among the signals output in sequence at the P/S unit 12, and for example, in a case where a modulation signal addressed to the terminal 200b is processed as the desired signal, an interference signal to be subtracted is generated based on a signal addressed to the terminal 200a which is processed prior to a signal addressed to the terminal 200b. Further, in the case where a modulation signal addressed to the terminal 200c is processed as the desired signal, an interference signal to be subtracted is generated based on the signals addressed to the terminal 200a and the terminal 200b. Note that, since there is no interference to be subtracted for a signal addressed to the terminal 200a which is input first, and for the signal addressed to the terminal 200a, the input signal is directly output.

The signals processed at the interference subtraction unit 13 are input to the modulo unit 14 and subjected to modulo arithmetic. Modulo arithmetic is non-linear arithmetic expressed by the following formula for adding an appropriate signal to an input signal for adjustment so that an output signal $f_\tau(z)$ falls within a range from the origin to $[-\tau/2, \tau/2]$ even when an input signal z is any value. Wherein, z is a complex number, j is an imaginary unit, $\tau$ is a constant of a real number determined according to a modulation method. Specifically, in a case where average power of a modulation symbol is normalized to 1, this resultes in $\tau=2\sqrt{2}$ in QPSK, $\tau=8/\sqrt{10}$ in the case of 16 QAM, and $\tau=16/\sqrt{42}$ in 64 QAM. Further, floor (x) represents a maximum integer not exceeding x.

[Math 3]

$$f_\tau(z) = z - \text{floor}\left(\frac{\text{Re}(z) + \frac{\tau}{2}}{\tau}\right)\tau - j\text{floor}\left(\frac{\text{Im}(z) + \frac{\tau}{2}}{\tau}\right)\tau \qquad (3)$$

Here, a signal added to an input signal in the formula (3) is referred to as a perturbation vector, and the modulo arithmetic may be also said as arithmetic in which a value equal to integral multiple of $\tau$ is added to an in-phase component and a quadrature-phase component of the input signal respectively. Amplitude of a signal is able to be brought to falling within a constant range by using such modulo arithmetic, thereby making it possible to transmit a signal from which multi-user interference is subtracted in advance while suppressing signal power which may be increased by subtracting an interference signal from a desired signal at the interference subtraction unit 13 as well as satisfying transmitting power. Note that, as described above, since subtraction of interference is not performed for the signal addressed to the terminal 200a, the signal necessarily falls within amplitude of a constant range without adding a perturbation vector, so that there is no need to perform the modulo arithmetic. Moreover, the modulo arithmetic may be performed, however, the same signal as the input signal is output as a result.

A signal subjected to such modulo arithmetic to be output from the modulo unit 14 is input to the interference generation unit 15 and the S/P unit 16. In the interference generation unit 15, a signal input sequentially from the modulo unit 14 is multiplied by an appropriate value among the interference coefficients input from the transmit weight/interference coefficient calculation unit 24, so that an interference signal to be subtracted from a desired signal at the interference subtraction unit 13 is generated. Here, when the interference coefficients are expressed as a matrix, a lower triangular matrix is provided as follows, and each element thereof is multiplied by a signal sequentially input from the modulo unit 14 to generate an interference signal.

[Math 4]

$$F = \begin{pmatrix} 0 & 0 & 0 & 0 \\ f_{21} & 0 & 0 & 0 \\ f_{31} & f_{32} & 0 & 0 \\ f_{41} & f_{42} & f_{43} & 0 \end{pmatrix} \quad (4)$$

$f_{qr}$ shown in the formula (4) represents a coefficient of interference of a signal addressed to a terminal r with a terminal q, and in a case where subtraction processing is performed at the interference subtraction unit 13 with a modulation signal addressed to the terminal q serving as a desired signal, each element in a q-th row in the matrix F is multiplied by a signal from the terminal 200a to a terminal 200-q-1 (signal output from the modulo unit 14), thereby generating an interference signal. Here, respective elements in the first row in the matrix F representing the interference coefficients are all zero, however, this shows, as described above, that there is no interference signal to be subtracted from the signal addressed to the terminal 200a. Moreover, here, it has been described that a result of multiplying an interference coefficient by an output signal from the modulo unit 14 is subtracted from a desired signal for simple explanation of basic processing of suppressing multi-user interference by subtracting an interference signal from a desired signal, however, depending on a calculation method of the matrix F, there may be a case where calculation is performed such that plus and minus of each element has already included the subtraction processing. In such a case, for appropriately performing interference suppression processing at the interference subtraction unit 13, it is required to reverse plus and minus of the calculated matrix F, and thereafter multiplied by an output signal from the modulo unit 14, or to perform addition processing in place of the subtraction processing at the interference subtraction unit 13.

As described above, by repeatedly performing processing such as subtraction of an interference signal, suppression of increase in signal power by modulo arithmetic, and generation of an interference signal for each signal addressed to each terminal, multi-user interference is appropriately suppressed, thus enabling to generate transmitting signals excellent in a power efficiency.

In this manner, signals in which multi-user interference is suppressed are input to the S/P unit 16 next, and subjected to serial-parallel conversion so that signals addressed to each of the terminals are output in parallel. Then, at the transmit weight multiplication unit 17, the transmitting signal is multiplied by a transmit weight, so that a result thereof is input to the signal multiplexing unit 18. Note that, a signal to be transmitted from an antenna 21-i is input to the signal multiplexing unit 18-i. In the signal multiplexing unit 18, a specific data signal addressed to each terminal, a pilot signal for channel estimation and a signal representing an interference coefficient or the like commonly notified to each terminal are multiplexed. Here, the interference coefficient is assumed to include a coefficient used for normalization of power. In the present embodiment, these signals are assumed to be multiplexed temporally. This specifically results in processing to generate a frame as shown in FIG. 3.

Here, a pilot signal for channel estimation is a known signal between a transmitter and a receiver and used for demodulation of a desired signal on a receiving side. In the embodiment, as the pilot signal, prepared are two kinds including a pilot signal to demodulate a signal representing an interference coefficient commonly notified to each terminal (a signal to which a numeral 0 is added in FIG. 3), and a pilot signal to demodulate a specific data signal subjected to spatial multiplexing addressed to each terminal (a signal to which numerals 1 to 4 are added in FIG. 3), which are assumed to be multiplied by a data signal or the like in the signal multiplexing unit 18. Note that, in the present embodiment as shown in FIG. 2, an interference coefficient notification signal (information concerning an interference signal) is configured to be transmitted only from an antenna 21-1, and a pilot signal thereof is similarly transmitted only from the antenna 21-1. Furthermore, the reason why four pilot signals for demodulation of the specific data signal are prepared is that pilot signals transmitted from respective transmitting antennas are orthogonalized temporally so as not to interfere with each other, and for the pilot signals before multiplication of a transmit weight to which numerals 1 to 4 are added in FIG. 3, only systems continuing from the pilot signal generation unit 22 to the antennas 21-1 to 4 are supposed to be output. Further, for a pilot signal for demodulating a specific data signal, it is assumed that a known signal generated at the pilot signal generation unit 22 is multiplied by the same transmit weight as that is multiplied by a data signal at the transmit weight multiplication unit 23 and thereafter input to the signal multiplexing unit 18.

Figure 3:
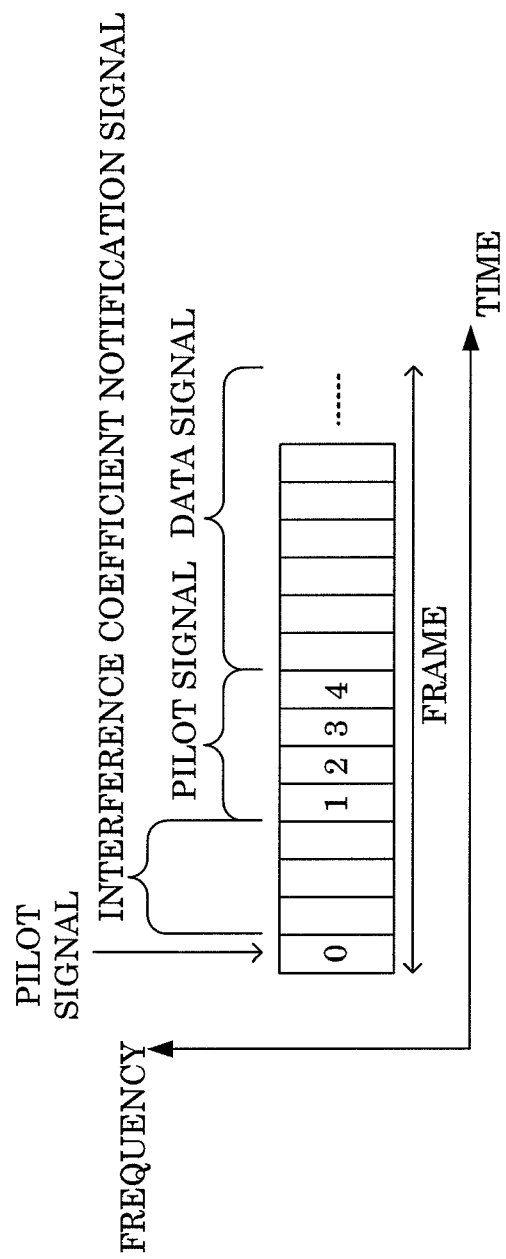
FIG. 3 is a diagram showing a frame of a multiplexed signal generated in a signal multiplexing unit.

A transmitting frame as shown in FIG. 3 generated at the signal multiplexing unit 18 in this manner is converted from a digital signal into an analog signal at the D/A unit 19, and converted into a frequency transmittable wirelessly at the wireless unit 20, subsequently transmitted from each of the transmitting antennas 21-1 to 4. In such a configuration, when a receiving method in which respective terminals are notified of a common interference coefficient, thereby combining signals received by the spatial multiplexing target antenna and the auxiliary antenna respectively is used by each terminal, it is possible to perform transmitting processing so that signal combining is able to be performed appropriately at these terminals.

Description will simply be given here for a calculation method of a transmit weight and an interference coefficient in THP-MU-MIMO transmission to which the present embodiment is directed. Note that, in the THP-MU-MIMO transmission, though a transmit weight generation method or the like has some types, here, an example of a case of generating a transmit weight or the like according to an MMSE criterion is illustrated. First, assuming that a transmit weight multiplied by a signal at the transmit weight multiplication units 17 and 23 is P, a coefficient for normalizing transmitting power to a prescribed value is β, a transmitting signal vector before multiplication of a transmit weight (output of S/P unit 16) is v, a covariance matrix of the transmitting signal vector v is $R_v$, and total transmitting power determined in advance is $E_{TX}$, P, F and β are calculated by the following formula.

[Math 5]

$$\{P, F, \beta\} = \underset{\{P,F,\beta\}}{\mathrm{argmin}}[\|\epsilon\|_2^2] \quad (5)$$

$$\text{s.t. } tr(PR_vP^H) = E_{TX}, S_mFe_m = 0_m, m = 1, 2, 3, 4$$

Wherein, y=argminX shows that y which minimizes X is obtained, and ε is a value representing an error between a transmitting signal and a received signal, expressed by the following formula.

[Math 6]

$$\epsilon = v - Fv - \beta^{-1}HPv - \beta^{-1}n \quad (6)$$

Accordingly, the formula (5) means to obtain P, F and β which minimize a mean square error between a transmitting signal and a received signal. Note that, in obtaining this solution, there is a constraint condition shown on the lower line of the formula (5), and the first formula of the constraint condition shows prescription of transmitting power. Further, the second formula of the constraint condition shows that the matrix F becomes a lower triangular matrix, and the present embodiment is directed to an example in which four terminals are subjected to spatial multiplexing, and thus m becomes 1 to 4. Here, $S_m = S_{(m, 4-m)} = [I_m, 0_{mx\ (4-m)}]$, and this is a matrix in which a first to m-th elements in an m-th column of the matrix F are zero. Moreover, $e_m$ represents a vector in an m-th column of a unit matrix.

When obtaining P, F and β which minimize a mean square error between a transmitting signal and a received signal under such a constraint condition, solutions are respectively shown as follows. Wherein, ξ represents a mean noise power to signal power ratio (inverse of SNR).

[Math 7]

$$P = \beta \sum_{m=1}^{4} (H^H S_m^T S_m H + \xi I_{4 \times 4})^{-1} H^H S_m^T S_m e_m e_m^T \quad (7)$$

$$F = \sum_{m=1}^{4} (S_m^T S_m - I_{4 \times 4}) H (H^H S_m^T S_m H + \xi I_{4 \times 4})^{-1} H^H e_m e_m^T \quad (8)$$

$$\beta = \sqrt{E_{TX} / tr(P R_v P^H)} \quad (9)$$

An interference coefficient matrix F as expressed by the formula (8) is multiplied by a transmitting signal addressed to each terminal at the interference generation unit 15 to generate multi-user interference, and a signal from which the multi-user interference is subtracted and subjected to modulo arithmetic is multiplied by a transmit weight P expressed by the formula (7) at the transmit weight multiplication units 17 and 23, thereby making it possible to realize THP MU-MIMO transmission according to the MMSE criterion to which the present embodiment is directed. Note that, as described above, description has been given that at the interference subtraction unit 13, a result of multiplying an interference coefficient by an output signal of the modulo unit 14 is subtracted from a desired signal, however, since plus and minus signs including subtraction processing already is added to the interference coefficient F expressed by the formula (8), for performing appropriate interference suppression processing at the interference subtraction unit 13, it is necessary to reverse plus and minus of a calculated matrix F, and thereafter multiplied by an output signal of the modulo unit 14, or to perform addition processing in place of subtraction processing at the interference subtraction unit 13.

Figure 4:
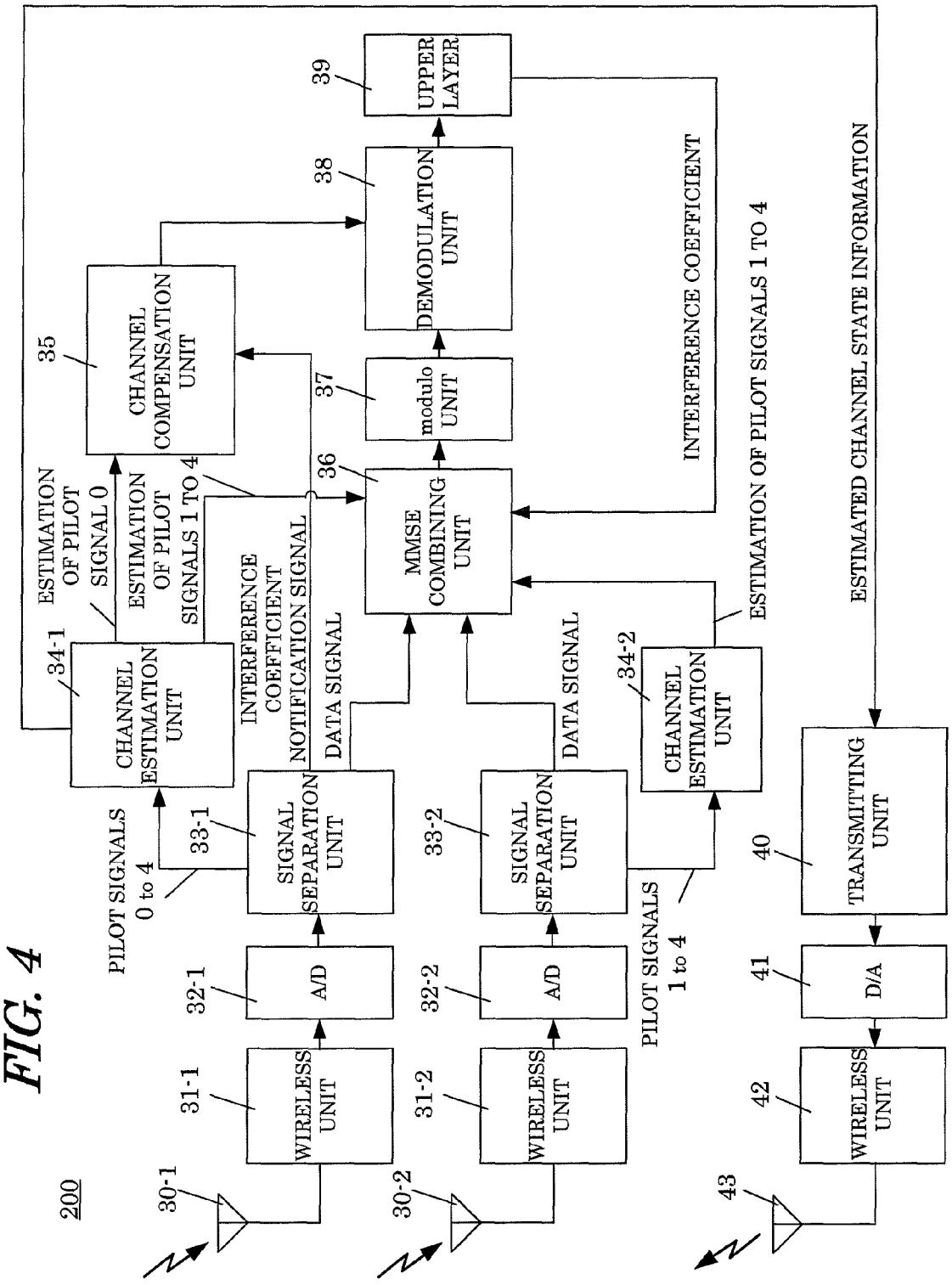
FIG. 4 is a block diagram showing a terminal in the first embodiment.

An apparatus configuration of each terminal which receives a signal to which spatial multiplexing processing is performed in the base station as described above is shown as follows. An apparatus configuration of a terminal 200 in the present embodiment is shown in FIG. 4. As shown in FIG. 4, the terminal 200 in the present embodiment is comprised of a receiving antenna units 30-1 and 2, wireless units 31-1 and 2, and 42, an A/D unit 32-1 and 2, a signal separation unit 33-1 and 2, a channel estimation unit 34-1 and 2, a channel compensation unit 35, an MMSE combining unit 36, a modulo unit 37, a demodulation unit 38, an upper layer 39, a transmitting unit 40, a D/A unit 41 and a transmitting antenna unit 43.

In the terminal 200, first, signals transmitted from the base station 100 shown in FIG. 2 are received by the receiving antenna units 30-1 and 2, and the received signals are converted into A/D convertible frequencies at the wireless units 31-1 and 2, subsequently converted into digital signals from analog signals at the A/D unit 32, thereafter the received signals are input to the signal separation units 33-1 and 2. At each of the signal separation units 33-1 and 2, a signal which is temporally multiplexed is separated in the base station 100 as shown in FIG. 3. Specifically, the pilot signals (0 to 4 in FIG. 3), the interference coefficient notification signal, and the data signal are separated to be input respectively to each of the channel estimation units 34-1 and 2, the channel compensation unit 35, and the MMSE combining unit 36. Note that, in the present embodiment, it is assumed that for the interference coefficient notification signal which is not subjected to spatial multiplexing, only a signal received by the receiving antenna unit 30-1 is demodulated to be obtained, and at the signal separation unit 33-2, the pilot signal 0 and the interference coefficient notification signal are supposed to be discarded.

Based on the pilot signals input from the signal separation unit 33-1 and 2, channels are estimated at the channel estimation unit 34-1 and 2. Note that, at the channel estimation unit 34-1, channel estimation using the pilot signals 0 to 4 is performed, and at the channel estimation unit 34-2, channel estimation using the pilot signals 1 to 4 is performed. At the time, since the pilot signal 0 is not multiplied by the transmit weight, the channel estimated using the pilot signal 0 is a channel between the transmitting antenna unit 21-1 of the base station and the receiving antenna unit 30-1 of each terminal, and this estimated result is input to the channel compensation unit 35. Furthermore, since the pilot signals 1 to 4 are multiplied by transmit weights, a channel estimated by the channel estimation unit 34-n in the terminal m becomes $H_{mn}P$, so that the estimated result is input to the MMSE combining unit 36.

At the channel compensation unit 35, channel compensation of an interference coefficient notification signal is performed, and the interference coefficient notification signal subjected to channel compensation is input to the demodulation unit 38. Then, the interference coefficient notification signal is demodulated at the demodulation unit 38 and the demodulated interference coefficient notification signal is input to the upper layer 39. At the upper layer 39, the interference coefficient which is converted into digital information in the base station 100 is reproduced, to be input to the MMSE combining unit 36.

Into the MMSE combining unit 36, the data signal subjected to spatial multiplexing, the estimated channel $H_{mn}P$ and the interference coefficient are input from the signal separation unit 33, the channel estimation unit 34 and the upper layer 39, respectively, which are used to combine signals received respectively by two receiving antennas. Specifically, a receiving signal vector $y_m = [y_{m1}\ y_{m2}]^T$ received by two antennas of the terminal m is first divided by a power normalization coefficient β used in the base station, and subsequently multiplied by a receiving MMSE weight expressed by the following formula, thereby performing combining. The receiving weight is to minimize a mean square error between a signal received at each terminal and a desired signal.

[Math 8]

$$W_m = (I_{4 \times 4} - F) R_v (H_m P)^H \{H_m P R_v (H_m P)^H + \xi I_{2 \times 2}\}^{-1} \quad (10)$$

Wherein, $H_m = [H_{m1}^T\ H_{m2}^T]^T$.

Signals multiplied by such a receiving weight to be combined become vectors, an m-th signal of which is a desired signal of the terminal m, and the terminal m thus inputs the m-th signal to the modulo unit 37, performs modulo arithmetic expressed by the formula (3) which is the same as that is performed in the base station, thereafter demodulating the desired signal at the demodulation unit 38. Then, the demodulated signal is output to the upper layer 39.

Further, in the terminal 200 in the present embodiment, there is a need to feed back the channel state information (CSI) to the base station 100, and this is performed in a manner such that information concerning a channel estimated by the channel estimation unit 34-1 is input to the transmitting unit 40, and transmitted toward the base station from the transmitting antenna unit 43 via the D/A unit 41 and the wireless unit 42. For this reason, as described above, in the present embodiment, a spatial multiplexing target antenna becomes each of the antennas 30-1 and each of the antennas 30-2 becomes an auxiliary antenna. Note that, in the present embodiment, it is assumed that measurement of CSI is performed by using pilot signals transmitted so as to be orthogonalized from each antenna without multiplication of a transmit weight, and measurement is performed in a frame having a configuration different from the frame shown in FIG. 3.

The configuration of the terminal as described above is provided and signals received by two antennas of the spatial multiplexing target antenna and the auxiliary antennas are thereby able to be multiplied by a receiving weight expressed by the formula (10), and making it possible to combine even a desired signal component included in the signal received by an antenna which is not subjected to spatial multiplexing on the base station side is combined, thus enabling to obtain excellent receiving characteristics compared to the case of demodulating a signal received by one antenna.

Here, in the present embodiment, a transmit weight, an interference coefficient and the like to be used in the base station are assumed to be calculated according to the MMSE criterion, however, not limited thereto and may be performed according to a ZF (Zero Forcing) criterion, or calculation using QR decomposition. Note that, in the case of using QR decomposition, since a received signal is multiplied by gain represented by a diagonal component in a triangular matrix obtained by QR decomposition to be received by the spatial multiplexing target antenna, the received signal is divided by the gain and thereafter needs to be combined with a signal received by the auxiliary antennas.

Further, in the present embodiment, an example which is directed to single carrier transmission is illustrated, however, the present invention is also applicable to a system performing multicarrier transmission. In the case of applying to the multicarrier transmission system, calculation of a transmit weight or an interference coefficient may be performed for each subcarrier or by a unit into which some subcarriers are grouped. Moreover, in the present embodiment, pilot signals transmitted from respective antennas are processed so as to be orthogonalized temporally, while, in the multi-carrier transmission system, pilot signals may be arranged to different subcarriers and transmitted so as to be orthogonalized in a frequency domain. In such a multi-carrier transmission system, an IFFT (Inverse Fast Fourier Transform) unit, an FFT unit, a GI (Guard Interval) insertion unit and the like are required to be provided in the base station and the terminal.

Moreover, in the present embodiment, it is configured so that an interference coefficient is once converted into digital information and the information is modulated similarly to a data signal to be notified to a terminal, however, it may be configured that the interference coefficient is notified as an analog signal. In such a case, a signal which has each element in the matrix F serving become amplitude is transmitted from the base station as an interference coefficient notification signal.

Further, in the embodiment, it is assumed that a pilot signal for channel estimation for use in demodulation of an interference coefficient notification signal is transmitted only from one antenna, however, not limited thereto, and only have to be configured that all the terminals are capable of demodulating the interference coefficient notification signal.

Further, in the embodiment, a data signal to be transmitted is not subjected to error correction encoding, however, not limited thereto, and may be configured to be subjected to error correction encoding in the base station so as to be decoded at a terminal.

Second Embodiment

In the first embodiment, it is assumed that interference subtraction processing at the interference subtraction unit 13 in the base station is performed only for four terminals in sequence from the terminal 200$a$1, however, the subtraction processing is not necessarily performed in the fixed order, and may be configured to change processing order appropriately depending on a channel. This is meant to perform processing such that, for example, a desired signal addressed to the terminal 200$c$ is processed first, followed by subtraction of an interference signal generated from the desired signal addressed to the terminal 200$c$ from a desired signal addressed to the terminal 200$a$, and further, from a desired signal addressed to the 200$d$, an interference signal generated from the desired signals addressed to the terminal 200$a$ and the terminal 200$c$ are subtracted from the desired signal addressed to the terminal 200$d$, and finally, an interference signal generated from desired signals addressed to all the other terminals is subtracted from a desired signal addressed to the terminal 200$b$. Such a processing order is determined appropriately according to a channel, and compared to a case where processing is performed in order determined in advance, a power efficiency is thereby able to be improved so as to obtain excellent receiving characteristics. Such processing order is also referred to as ordering, and in the present embodiment, description will be given for a case where the ordering is changed adaptively.

Description will be given for a base station configuration in the case of performing adaptive ordering to which the present invention is directed. A base station in the case of performing adaptive ordering to which the present invention is directed is able to be realized by the same configuration as that of the base station 100 shown in FIG. 2, however, the ordering as described above is supposed to be performed in a frame unit as shown in FIG. 3 in the transmit weight/interference coefficient calculation unit 24 receiving CSI from each terminal. The ordering includes some methods but regardless of the method of ordering, in the present invention, ordering is performed for each subcarrier in the case of applying to the multi-carrier transmission system. Calculation of a transmit weight and an interference coefficient is performed in view of ordering at the transmit weight/interference coefficient calculation unit 24, and in the case of performing processing in the order in ordering determined in advance as the first embodiment, the matrix F representing the interference coefficient is calculated as the lower triangular matrix, while a matrix F in the case of performing adaptive ordering is expressed as follows. Note that, an example is illustrated in which the ordering is arranged in the order of the terminal 200c, the terminal 200a, the terminal 200d, and the terminal 200b, as described above.

[Math 9]

$$F = \begin{pmatrix} f_{13} & 0 & 0 & 0 \\ f_{23} & f_{21} & f_{24} & 0 \\ 0 & 0 & 0 & 0 \\ f_{43} & f_{41} & 0 & 0 \end{pmatrix} \quad (11)$$

$f_{qr}$ shown in the formula (11) represents, similarly to the first embodiment, a coefficient of interference of a signal addressed to a terminal r with a terminal q.

The matrix F representing an interference coefficient calculated in this manner is input to the upper layer 10 and the interference generation unit 15, however, the matrix F does not necessarily form the simple lower triangular matrix as shown in the first embodiment, and in the upper layer 10, it is thus required to generate an interference coefficient notification signal that enables each terminal to reconfigure the matrix F correctly. This is allowed to be realized by transmitting all elements including zero, contrary to the case in the first embodiment where only the elements other than zero in the matrix F are transmitted to a terminal as an interference coefficient notification signal.

However, in the case of sending all elements including zero as an interference coefficient notification signal, an information volume thereof increases to degrade a transmission efficiency, therefore, it is able to be realized effectively by including as an interference coefficient notification signal, not only elements other than zero in the matrix F but also information showing how many elements other than zero are included in which column in a matrix. For this, in a case where a matrix F expressed in the formula (11) is calculated, in addition to respective elements other than zero which are [$f_{13}$ $f_{23}$ $f_{21}$ $f_{24}$ $f_{43}$ $f_{41}$], the number of elements other than zero in each row which are [1 3 0 2] may be notified to each terminal. That is, this is equivalent to notifying each terminal of the order in ordering. At each terminal receiving such an interference coefficient notification signal correctly reconfigures the matrix F representing an interference coefficient as expressed in the formula (1), which is able to be used for calculation of a transmit weight expressed in the formula (10).

Further, in the upper layer 10 in the base station, specific data transmitted to each terminal is rearranged according to the order in ordering. For such rearranging, as mentioned also in the first embodiment, in the case of performing THP MU-MIMO transmission, it is necessary to perform processing to subtract an interference signal from a desired signal sequentially while the order thereof is consistent with the order in ordering, processing of judging the order in ordering in the upper layer 10 receiving a matrix F from the transmit weight/interference coefficient calculation unit 24 for rearranging the data so as to perform appropriate interference subtraction is thus performed. When the matrix F is expressed by the formula (11), the rearranging is supposed to be performed so that subtraction of an interference signal is performed in the order of the terminal 200c, the terminal 200a, the terminal 200d and the terminal 200b. Note that, it is possible to perform the rearrangement processing by also notifying the P/S unit 12 of information concerning the ordering.

As described above, the interference coefficient notification signal in view of the ordering is generated, and appropriate interference subtraction is performed, thereby making it possible to have the configuration of the base station also corresponding to the case of changing the order in ordering adaptively, and the other blocks such as the transmit weight multiplication units 17 and 23, the signal multiplexing unit 18 may have the same configuration as shown in the first embodiment.

Next, description will be given for an apparatus configuration of a terminal in the present embodiment. The terminal in the present embodiment is also able to be realized by the same configuration as the first embodiment (FIG. 4). Note that, as described above, since the matrix F does not necessarily form the lower triangular matrix, for appropriately combining signals received respectively by the spatial multiplexing target antenna and the auxiliary antenna using a receiving weight expressed by the formula (10), it is necessary to appropriately reconfigure the matrix F based on the interference coefficient notification signal notified from the base station in view of also the order in the ordering. In the present embodiment, such reconfiguration is assumed to be performed at the upper layer 39 in FIG. 4. Further, in the formula (10), the matrix F is subtracted from a unit matrix $I_{4\times 4}$, however, in the case of performing adaptive ordering in the present embodiment, the unit matrix also needs to be rearranged in conformity to the ordering. Specifically, each element of 1 in a unit matrix is rearranged so as to be disposed at the right side of each element other than zero in the matrix F. For example, when the matrix F is expressed by the formula (11), $I_{4\times 4}$ used in the formula (10) is shown as follows.

[Math 10]

$$I_{4\times 4} = \begin{pmatrix} 0 & 1 & 0 & 0 \\ 0 & 0 & 0 & 1 \\ 1 & 0 & 0 & 0 \\ 0 & 0 & 1 & 0 \end{pmatrix} \quad (12)$$

Such a rearrangement is performed at the upper layer 39 similarly to the reconfiguration of the matrix F, and input to the MMSE combining unit 36 together with the reconfigured matrix F. Note that, the rearrangement of the unit matrix may be performed for a row or for a column. Then, a receiving weight expressed in the formula (10) is generated at the MMSE combining unit 36, to be multiplied by signals received respectively by the spatial multiplexing target antenna and the auxiliary antennas, thereby making it possible to combine even a desired signal component included in a signal received by an antenna which is not subjected to spatial multiplexing on a base station side. The other blocks may be configured to perform the same processing as shown in the first embodiment and with such a configuration of the terminal, even when the adaptive ordering is performed, signals received by the spatial multiplexing target antenna and the auxiliary antenna are able to be combined, thus making it possible to obtain excellent receiving property compared to a case of demodulating a signal received by one antenna.

Third Embodiment

Figure 5:
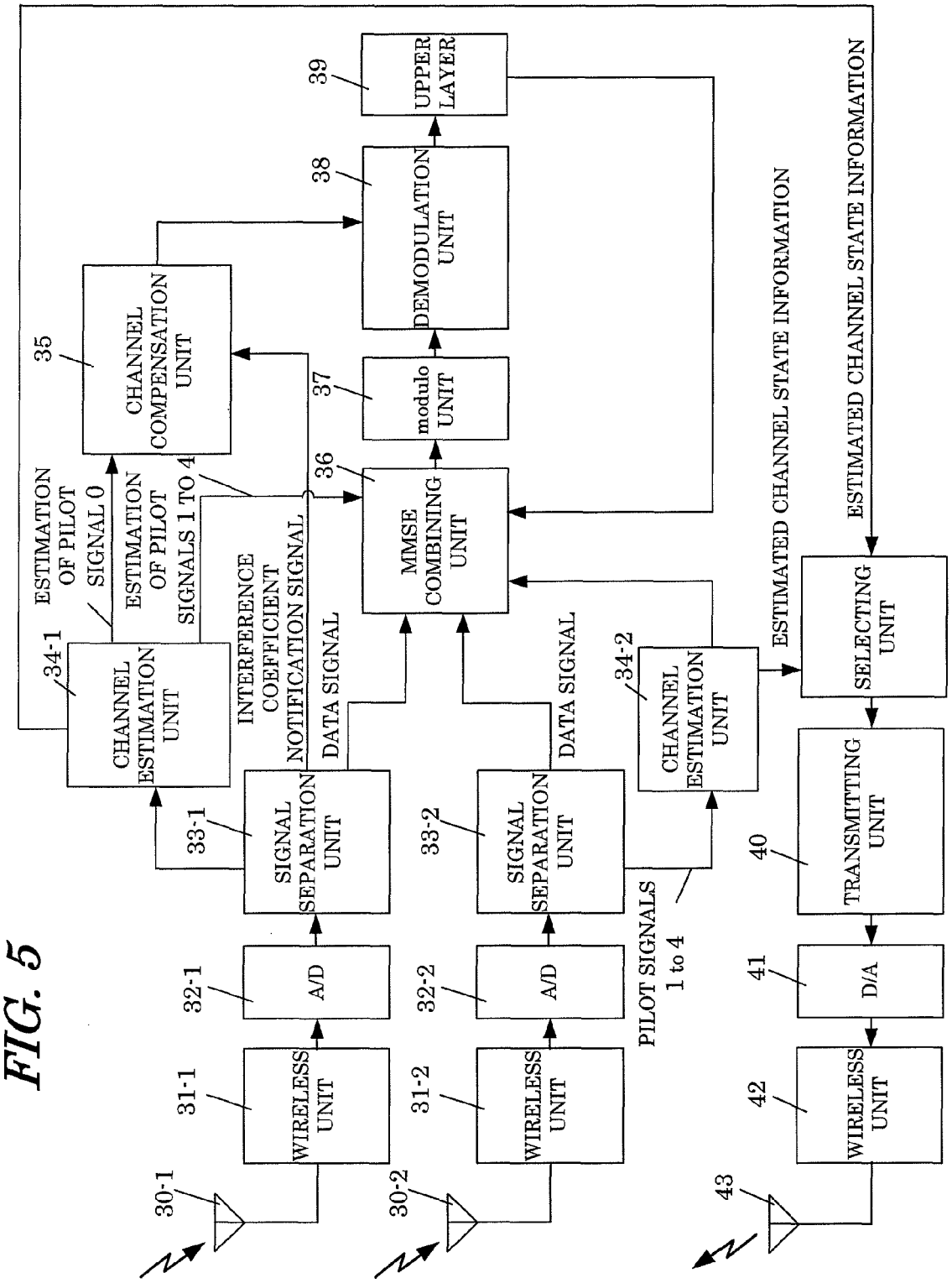
FIG. 5 is a block diagram showing a terminal in a third embodiment.

As seen also from FIG. 1, in the embodiments described above, description has been given for examples of a case where in each terminal, a receiving antenna unit 30-1 serves as a spatial multiplexing target antenna, a receiving antenna unit 30-2 serves as an auxiliary antenna, however, these are not necessarily fixed, and may be configured to switch between the spatial multiplexing target antenna and the auxiliary antenna depending on a situation of a channel. Such a configuration is able to be realized easily by measuring CSI at each receiving antenna of each terminal and only the CSI measured at any receiving antenna is fed back to the base station. Such an apparatus configuration is shown in FIG. 5. Note that, the terminal shown in FIG. 5 has a configuration in which a selecting unit 44 is added to the terminal shown in FIG. 4, while the other blocks perform the same operation shown in FIG. 4.

At the terminal shown in FIG. 5, CSI is measured at the channel estimation units 34-1 and 34-2, and such measurement results are input to the selecting unit 44. Then, in the selecting unit 44, any one of two pieces of input CSI is selected so as to be supposed to be output to the transmitting unit 40. Here, there are some possible methods as a CSI selection method, and for example, two pieces of CSI measured at the channel estimation units 34-1 and 34-2 at the terminal m is assumed to be $H_{m1}^T$ and $H_{m2}^T$, a method of comparing norms of these two vectors to select larger CSI is devised. Such a selection is adaptively performed so as to allow a receiving antenna having better channel state to serve as the spatial multiplexing target antenna, thus making it possible to obtain excellent receiving characteristics compared to a case of fixing the spatial multiplexing target antenna and the auxiliary antenna.

Furthermore, selection and switching of the spatial multiplexing target antenna and the auxiliary antenna are able to be performed also on the base station side. Note that, in this case, it is required to feed back two pieces of CSI from a terminal, and norms of two pieces of CSI respectively fed back from each terminal are compared at the transmit weight/interference coefficient calculation unit 24 as shown in FIG. 2, and larger CSI is collected for four terminals for calculation of a transmit weight and an interference coefficient expressed by the formula (7) and the formula (8).

Having the configuration as described above enables to adaptively select and switch the spatial multiplexing target antenna and the auxiliary antenna in a base station or a terminal, thus making it possible to obtain excellent receiving characteristics compared to a case of fixing the spatial multiplexing target antenna and the auxiliary antenna.

Fourth Embodiment

In the case of combining signals respectively received by the spatial multiplexing target antenna and the auxiliary antenna which has been illustrated in the above embodiments, excellent receiving characteristics are able to be obtained compared to a case of demodulating a signal received by one antenna, however, when a terminal is positioned near the base station so that it is possible to obtain a very high SNR, a difference in those characteristics is reduced and a merit to combine two received signals becomes considerably smaller. Further, even in a situation where a terminal stands still, only a signal received by the spatial multiplexing target antenna is demodulated so that moderately good receiving characteristics are thereby able to be obtained. In addition to this, since there is also a problem that in the signal combining method according to the present invention, it is required to notify each terminal of an interference coefficient calculated in the base station, which results in degradation of the transmitting efficiency compared to a case of not giving notification of such information, therefore, it is considered that establishment of a more efficient system is able to be realized not by performing combining of signals according to the present invention all the time, but by applying the present invention only to an appropriate situation.

Figure 6:
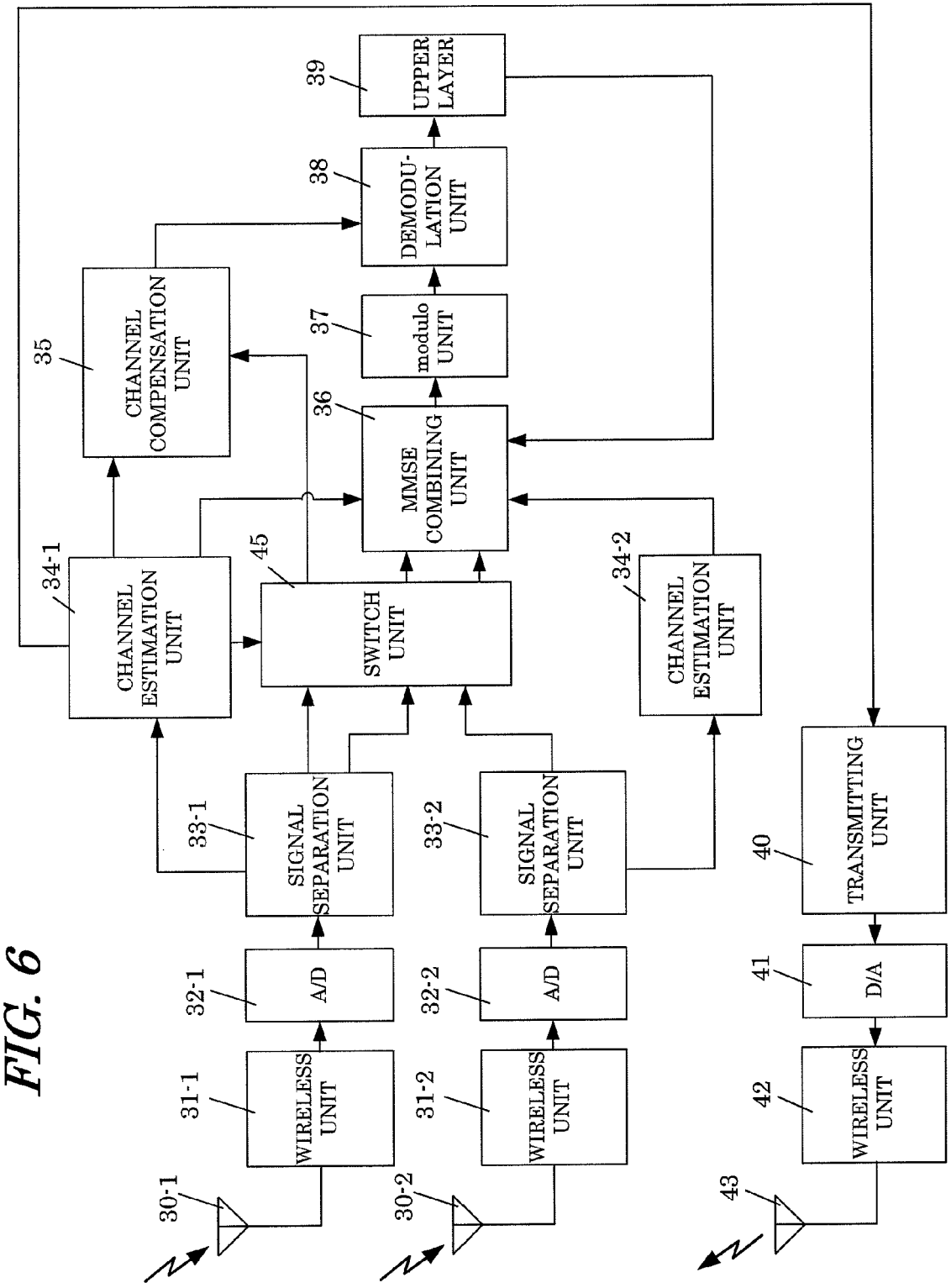
FIG. 6 is a block diagram showing a terminal in a fourth embodiment.
Figure 7:
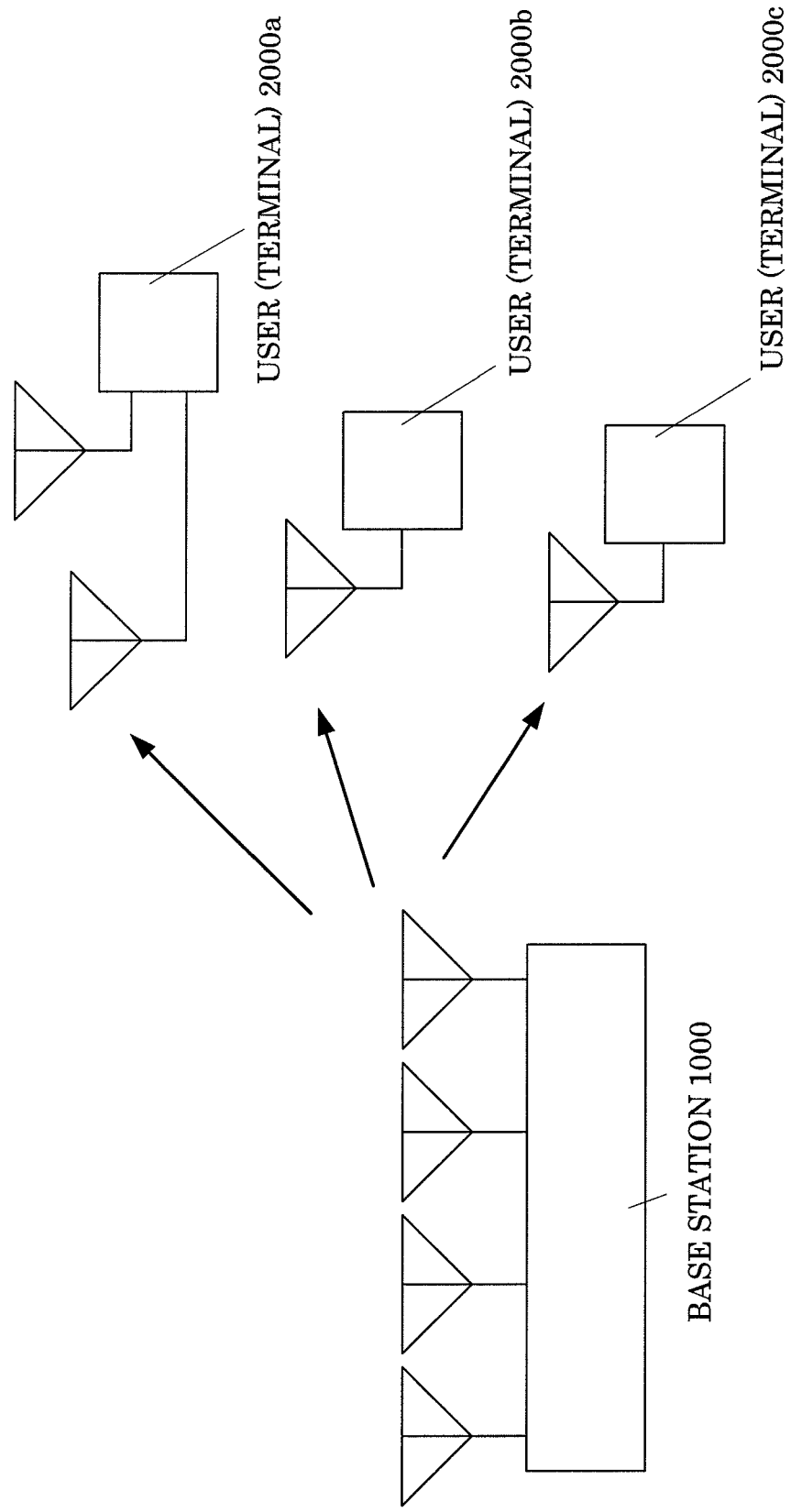
FIG. 7 is a diagram showing a conventional MU-MIMO wireless communication system.

An apparatus configuration of a terminal for switching whether signal combining is applicable or inapplicable according to the present invention is shown in FIG. 6. The terminal shown in FIG. 6 is provided with a configuration in which a switch unit 45 is added to the terminal shown in FIG. 4. In the switch unit 45 newly added, for switching whether signal combining is applicable or inapplicable according to the present invention, whether or not to input a received signal in the MMSE combining unit 36 is switched. Specifically, this is able to be realized by processing of estimating a received SNR from a channel estimation value of each terminal, and inputting, in a case where the received SNR is higher than a threshold determined in advance, a received data signal received by the spatial multiplexing target antenna 30-1 not to the MMSE combining unit 36 but the channel compensation unit 35. Then, the data signal for which a channel is compensated in the channel compensation unit 35 is input to the modulo unit 37 so that modulo arithmetic is performed, thereafter demodulated at the demodulation unit 38. At the time, the signal received by the auxiliary antenna 30-2 is not to be input to any block so as to be discarded. Meanwhile, when the received SNR is lower than the threshold determined in advance, data signals received by the spatial multiplexing target antenna 30-1 and the auxiliary antenna 30-2 respectively are input to the MMSE combining unit 36 from the switch unit 45, so that processing shown in the first embodiment is performed to combine signals. Such the switch unit 45 is newly provided, thereby making it possible to switch between applicable and inapplicable of signal combining according to the present invention based on the received SNR. At the time, in the base station, whether or not to give notification of an interference coefficient according to switching in a terminal is switched, thereby making it possible to cut out the need of transmitting an interference notification signal in the case of not performing signal combining by a terminal, so that degradation of a transmitting efficiency is able to be suppressed. This is able to be performed by methods of feeding back from a terminal information showing signal combining is applicable or inapplicable or estimating from the CSI fed back from the terminal for calculation of a transmit weight or an interference coefficient. Normally, a received SNR is determined roughly according to a position of a terminal (a distance from a base station, indoor/outdoor), and there is thus no necessity to switch between being applicable and being inapplicable so frequently, and it may be switched whether or not to transmit an interference coefficient notification signal depending on a receiving method of a terminal in a next frame based on the information fed back from the terminal.

Further, as described above, switching between being applicable and being inapplicable depending on movement speed of a terminal is effective, and this is able to be realized by inputting information concerning movement speed to the switch unit 45 and comparing with a threshold concerning movement speed determined in advance. Further, in view of both the received SNR and the movement speed of the terminal, it is also possible to apply signal combining according to the present invention to only a case where the received SNR is lower than the threshold and the movement speed is faster than the threshold.

Further, in the configuration shown in FIG. 6, in the case of not performing signal combining, the signal received by the auxiliary antenna 30-2 is assumed to be discarded, however, when it has been known in advance that signal combining is not to be performed, it is possible to reduce power consumption at a terminal by not performing processing at the wireless unit 31-2, or the A/D unit 32-2. When the received SNR is high enough or the terminal almost stands still, such information showing that signals are not to be combined is input to the wireless unit 31-2, or the A/D unit 32-2 so as to stop subsequent processing of blocks. For the mobile terminals, how to reduce power consumption is also important, and such processing is performed so that a battery is able to be used effectively.

Contrary to this, in a case where a situation that power consumption should be reduced such as a low power consumption mode or the like is caused, it is possible to perform switching so that signal combining according to the present invention is not performed. This is able to be realized so that it is configured that when a remaining battery level of a terminal becomes a threshold or less determined in advance and the terminal is switched into a low power consumption mode, information notifying of switching into the low power consumption mode is notified to the switch unit 45, and further to the wireless unit 31-2 and the A/D unit 32-2, so that these blocks stop processing based on the notification information. Further, such switching based on the mode of the terminal is effective also in an MU-MIMO transmission system using linear precoding, and the information of notifying of switching into the low power consumption mode as described above is input to an appropriate block, thereby stopping the processing in these blocks to allow effective use of a battery.

In the above embodiments, it is illustrated that the configuration that the channel state information at each terminal apparatus is fed back from each terminal apparatus to a base station, however, reciprocity between uplink and downlink is established in a TDD (Time Division Duplex) system, so that there is no necessity of feedback, and it may be configured to perform spatial multiplexing based on the channel information observed at the base station apparatus.

Further, in the above embodiment, it is configured that each terminal apparatus is notified of a matrix F representing an interference coefficient from the base station, however, not limited thereto, and it may be configured that in the matrix F, a component required for combining desired signals according to the present invention is estimated from a received pilot signal at each terminal apparatus. This is able to be performed since a lower triangular matrix of a matrix F is a lower triangular matrix of HP, by transmitting a pilot signal multiplied by a matrix P from the base station apparatus to go through a channel H, so that the pilot signal multiplied by HP is received by each terminal apparatus. Note that, at the time, each terminal is able to estimate only one row in each matrix F such as a first row in the matrix F at the terminal 1, a second row in the matrix F at the terminal 2, a third row in the matrix F at the terminal 3, or a fourth row in the matrix F at the terminal 4. Accordingly, in such a case, it is impossible to calculate a weight as shown in the formula (10). However, any one row in the matrix represented by the formula (10) is only required for combining desired signals by each terminal respectively, and it may thus replace $I_{4 \times 4} - F$ on the right-hand side of the formula (10) with a vector using only one row in the matrix F which is able to be estimated by each terminal apparatus for calculating a weight. As described in the embodiments above, in the case of using the weight of the formula (10), a combined signal becomes a vector, however, in the case of using the weight for which $I_{4 \times 4} - F$ is replaced with the vector using only one row in the matrix F which is able to be estimated by each terminal apparatus, combined signals become one value and the obtained value is a desired signal. Then, similarly to the above embodiments, modulo arithmetic is performed to the obtained desired signal, subsequently the desired signal may be demodulated at the demodulation unit 38. Having such a configuration allows to cut out the need to notify each terminal of the matrix F representing an interference coefficient from the base station apparatus, thus making it possible to improve the transmitting efficiency. Note that, the base station apparatus in this case is provided with the configuration in which a part of outputting an interference coefficient to the upper layer 10 is removed from the transmit weight/interference coefficient calculation unit 24 in FIG. 2. Moreover, the terminal apparatus may be configured that a part of outputting an interference coefficient notification signal to the channel compensation unit 35 is removed from the signal separation unit 33-1 in FIG. 4 and estimation of a part of the matrix F as described above is also performed in the channel estimation unit 34-1.

Additionally, a program which operates in a mobile station apparatus and a base station apparatus related to the present invention is a program for controlling a CPU or the like (program which causes a computer to function) for realizing functions of the above described embodiments related to the present invention. Then, information treated in such apparatuses is temporarily stored in a RAM at the time of processing thereof, thereafter stored in various ROMs or HDDs, and read by the CPU as necessary for modification or writing. A recording medium to store the program may be any of a semiconductor medium (for example, such as a ROM and a non-volatile memory), an optical recording medium (for example, such as a DVD, an MO, an MD, a CD and a BD), a magnetic recording medium (for example, such as a magnetic tape and a flexible disk) and the like. Moreover, by executing a loaded program, not only that the functions of the above described embodiments are realized, but also that the functions of the present invention are realized by performing processing, based on an instruction of the program, in cooperation with an operating system or another application program and the like in some cases.

Further, in the case of distribution to the market, it is possible to store the program in a portable type recording medium so as to be distributed, or transfer to a server computer connected via a network such as Internet. In this case, a storage device of the server computer is also included in the present invention. Further, a part or all of the mobile station apparatus and the base station apparatus in the above described embodiments may be realized typically as an LSI which is an integrated circuit. Respective function blocks of the mobile station apparatus and the base station apparatus may be separately obtained as a processor or a part or all thereof may be integrated to be obtained as a processor. Further, a technique of obtaining an integrated circuit is not limited to an LSI and may be realized by a dedicated circuit, or a general purpose processor. Further, in the case of advent of a technology of obtaining an integrated circuit in replacement of an LSI with the advancement in the semiconductor technology, an integrated circuit according to the art may be used.

As described above, the embodiments of the present invention have been described in detail with reference to the drawings, but a specific configuration is not limited to the embodiments and design or the like not departing from the spirit of the invention is also included in the scope of claims.

DESCRIPTION OF REFERENCE NUMERALS

10 upper layer
11 modulation unit
12 P/S unit
13 interference subtraction unit
14 modulo unit 15 interference generation unit
16 S/P unit
17, 23 transmit weight multiplication unit
18 signal multiplexing unit
19 D/A unit
20, 27 wireless unit
21 transmitting antenna unit
22 pilot signal generation unit
23 transmit weight multiplication unit
24 transmit weight/interference coefficient calculation unit
25 receiving unit
26 A/D unit
27 wireless unit
28 receiving antenna unit
30 receiving antenna unit
30-1 spatial multiplexing target antenna
30-2 auxiliary antenna
31 wireless unit
32 A/D unit
33 signal separation unit
34 channel estimation unit
35 channel compensation unit
36 MMSE combining unit
37 modulo unit
38 demodulation unit
39 upper layer
40 transmitting unit
41 D/A unit
42 wireless unit
43 transmitting antenna unit
44 selecting unit
45 switch unit
100 base station
200 each terminal

The invention claimed is:

1. A receiving apparatus which has N pieces of receiving antennas where N is an integer of 2 or more and which receives a signal transmitted from a transmitting apparatus which has a plurality of transmitting antennas and performs spatial multiplexing with nonlinear precoding using nonlinear arithmetic, wherein,
a signal which is generated by sequentially subtracting interference from a desired signal based on channel state information between the transmitting apparatus and the plurality of receiving apparatuses and which subjected to spatial multiplexing with the non-linear precoding using a modulo-arithmetic operation, is received by the N pieces of the receiving antennas,
a receiving weight is calculated based on a term representing a coefficient of the interference subtracted sequentially from the desired signal,
the received signal is multiplied by the receiving weight to be combined, and
the modulo-arithmetic operation is performed to the combined signal so that a desired signal is detected,
wherein the receiving weight has a term of I-F where I is a unit matrix and F shows a coefficient matrix.

2. The receiving apparatus according to claim 1, wherein the receiving weight minimizes a mean square error between the desired information signal transmitted from the transmitting apparatus and the signal after multiplication of the receiving weight.

3. The receiving apparatus according to claim 1, wherein the term representing the coefficient of the subtracted interference is obtained based on information notified from the transmitting apparatus.

4. The receiving apparatus according to claim 1, wherein the channel state information which includes channels of less than N is transmitted from the receiving apparatus to the transmitting apparatus.

5. A transmitting apparatus which has a plurality of transmitting antennas and which performs spatial multiplexing to signals addressed to a plurality of receiving apparatuses including a first receiving apparatus which has N pieces of receiving antennas where N is an integer of 2 or more for performing communication, wherein,
a transmit weight for performing spatial multiplexing with the non-linear precoding using a modulo-arithmetic operation and a coefficient representing interference are calculated based on channel state information of less than N notified from the first receiving apparatus and channel state information notified from another receiving apparatus,
a term representing the coefficient of the interference is notified to the receiving apparatus,
the interference is subtracted sequentially from a desired signal, and
a result of the subtraction is multiplied by the transmit weight for performing spatial multiplexing to signals addressed to the plurality of receiving apparatuses,
wherein the term is F where F shows a coefficient matrix.

6. A wireless communication system comprising:
the receiving apparatus according to claim 1; and
a transmitting apparatus which has a plurality of transmitting antennas and which performs spatial multiplexing to signals addressed to the plurality of receiving apparatuses including a first receiving apparatus which has the N pieces of receiving antennas for performing communication, wherein,
a transmit weight for performing spatial multiplexing with the non-linear precoding using a modulo-arithmetic operation and a coefficient representing interference are calculated based on channel state information of less than N notified from the first receiving apparatus and channel state information notified from another receiving apparatus of the plurality of receiving apparatuses,
a term representing the coefficient of the interference is notified to the receiving apparatus,
the interference is subtracted sequentially from a desired signal, and
a result of the subtraction is multiplied by the transmit weight for performing spatial multiplexing to signals addressed to the plurality of receiving apparatuses.

7. The receiving apparatus according to claim 1, wherein F shows coefficient matrix of the interference subtracted from the desired signal.

* * * * *